Figure 1:
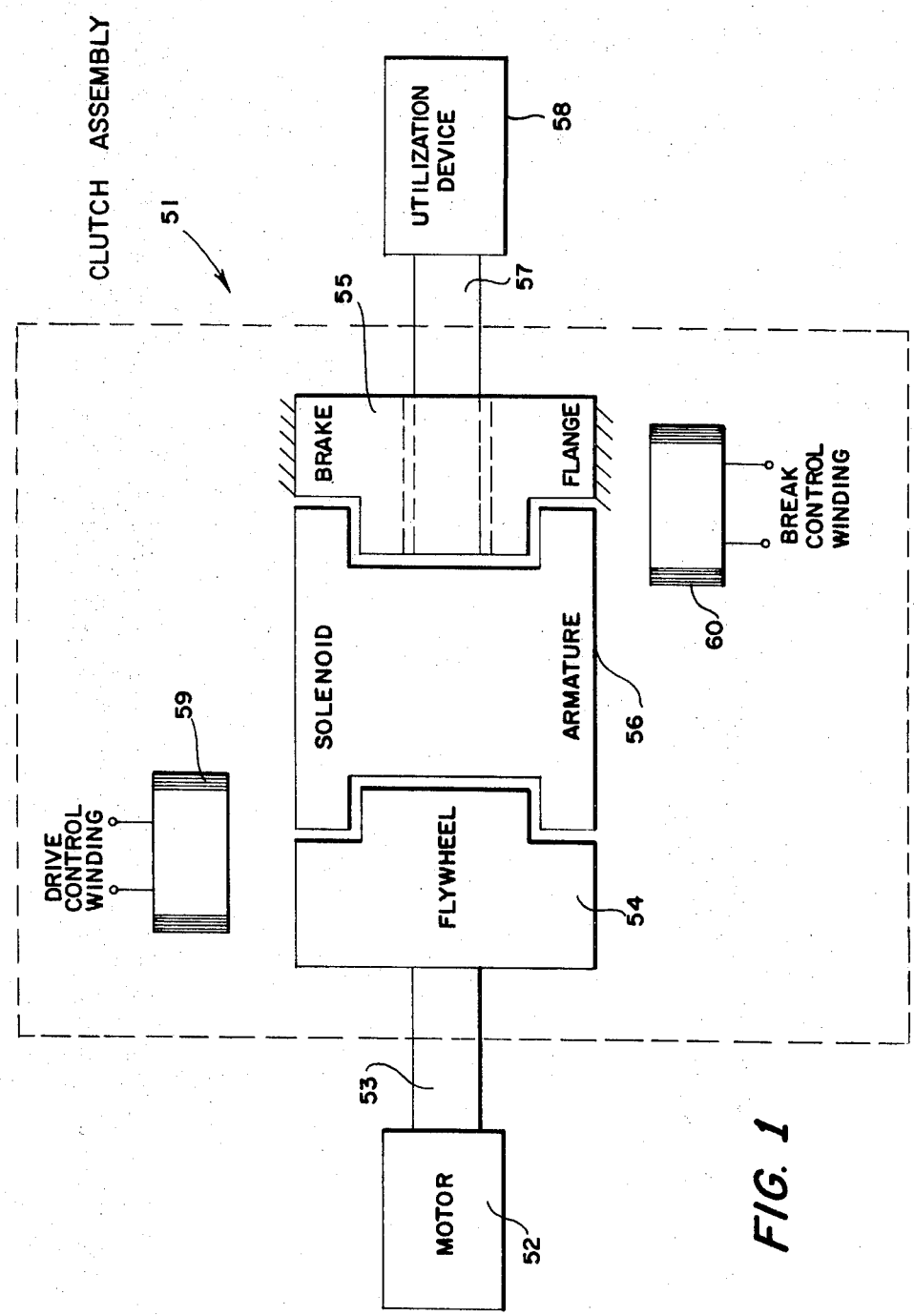

United States Patent

[11] 3,581,855

| [72] | Inventors | Georg Taeffner;<br>Rudolf Kling, Darmstadt, Germany |
|---|---|---|
| [21] | Appl. No. | 840,803 |
| [22] | Filed | July 10, 1969 |
| [45] | Patented | June 1, 1971 |
| [73] | Assignee | Quick-Rotan Becker & Notz KG<br>Darmstadt, Germany |
| [32] | Priority | July 19, 1968 |
| [33] | | Germany |
| [31] | | P 17 63 696.3 |

[54] ELECTROMAGNETIC CLUTCH AND BRAKE
10 Claims, 2 Drawing Figs.

[52] U.S. Cl. .................................................. 192/18b
  192/107, 192/113A, 192/111, 192/48.2
[51] Int. Cl. .......................................................... F16d 67/06
[50] Field of Search ................................................ 192/18.2,
  48.2, 84A—1

[56] References Cited
UNITED STATES PATENTS

| 2,862,590 | 12/1958 | Schuman | 192/18.2X |
| 3,240,302 | 3/1966 | Tuyl | 192/18.2 |
| 3,254,746 | 6/1966 | Myers | 192/18.2X |
| 3,463,027 | 8/1969 | Gelb | 192/18.2X |
| 3,487,438 | 12/1969 | Becker et al. | 192/18.2 |

*Primary Examiner*—Benjamin W. Wyche
*Attorney*—Otto John Munz

ABSTRACT: A clutch assembly for a motor drive including a motor shaft connected to a flywheel and a brake disc disposed in axially spaced relation to the flywheel. A solenoid armature is axially connected to an output shaft, between the flywheel and brake disc, for selectively and frictionally engaging the flywheel or the brake disc to respectively drive or brake the output shafts.

ELECTROMAGNETIC CLUTCH AND BRAKE

This invention relates to electromagnetic clutches capable of driving or braking an associated output shaft.

In a known clutch assembly with an electromagnetically operated friction clutch and friction brake (Berman Preliminary Publication (DAS) No. 1,265,843), the clutch disc and the brake disc are mounted at their periphery to flexible annular discs, which are fixedly mounted to the output shaft. Annular magnets for the clutch and for the brake, with an exterior diameter corresponding to the diameter of the clutch disc and brake disc, are mounted in a fixed relationship to the oppositely facing friction planes of the clutch disc and brake disc. The peripheral portions of the clutch disc and brake disc serve as magnetic paths, and friction linings are provided at radially closer portions of the clutch disc and brake disc. The energizing of the magnets causes these linings to be pressed either against a portion of the flywheel which is coaxially surrounded by the clutch magnet, or against a stationary brake flange which is coaxially surrounded by the brake magnet. In this known motor the friction linings of necessity of a smaller diameter than the clutch disc and brake disc. The friction surfaces are therefore comparatively small. Consequently, the magnets must exert a large force to transmit or brake a predetermined torque. The power requirement of the magnets is further increased by the fact that they must overcome preloading forces of the flexible annular discs. This means that the efficiency of the clutch, when expressed as the ratio between transmitted torque and the number of ampere turns required, is low. Because of this large number of ampere turns required, this clutch has a great magnetic inertia. As a result, both the clutch and the brake have an undesirably slow response. An additional important shortcoming is the fact that the frictional heat is generated in a zone which, with respect to a radial plane, lies comparatively centralized, where the heat can be dissipated only with difficulty and insufficiently.

In another known clutch motor with an electromagnetically operated friction clutch and friction brake (U.S. Pat. No. 3,254,746), preloading disc springs are avoided by having the clutch disc and brake disc mounted axially movable on a splined portion of the output shaft. But the clutch disc and brake disc are arranged inside of a pot-shaped recess of the flywheel on the side facing the output shaft and radially inside the clutch magnet, so that the clutch linings have again a small diameter and a small surface. Here, too, the efficiency and response time, as well as the heat dissipation leave something to be desired. This known arrangement has the additional shortcoming of a comparatively large axial space requirement which is troublesome in many applications.

One object of the invention is the creation of a clutch motor with an electromagnetically operated friction clutch and friction brake, where the transmission of a predetermined power and torque requires a small number of ampere turns and which has improved heat dissipation.

Using a clutch motor of the class stated in the introduction, the object is attained, according to the invention, by choosing substantially equal diameters for the flywheel, the clutch disc, the brake disc, and the brake flange, as well as for the friction linings. The object is furthered by arranging the coils axially side by side inside a coil housing which reaches into an annular recess between the peripheral portions of the clutch disc and the brake disc, and which surrounds coaxially at least part of the peripheral zones of the flywheel and of the brake flange with a small radial clearance. Large friction surfaces are thereby obtained, while the unit length is kept small. The number of ampere turns required for the transmission of a predetermined torque is therefore comparatively small and the magnetic inertia is low. The clutch disc and brake disc can easily be designed to have a small flywheel moment. The response times for starting and stopping are short. This means, for example, that in the application of the clutch motor in industrial sewing machines, the execution of a great number of single stitches per second is made possible. Also, frictional heat is generated in radially peripheral zones and can therefore be dissipated without difficulty.

The embodiment of the invention is further improved by selectively arranging the magnetic force flow from the coils over the clutch disc or the brake disc in such a way that the clutch disc and the brake disc are urged in the same direction. This has the important advantage in that when the clutch is operated, the stray field of the clutch coil also automatically disengages the brake disc. Conversely, when the brake is operated, the clutch disc is automatically disengaged. This kind of positive disengagement of the clutch disc and brake disc is obtained in a very simple way, by arranging magnetically conductive portions of the clutch disc and brake disc in close proximity.

The armature of the controlling electromagnets includes the portions of the clutch disc and brake disc which are located radially inside the friction linings. The embodiment of the invention further comprises two hubs which are each surrounded by one of the coil housings. To these hub portions are mounted support rings facing the flywheel and the brake flange, respectively. Each of the support rings carrying a friction lining. This makes it possible to obtain, on the one hand, favorable magnetic operating conditions, particularly a low resistance in the magnetic flow path, thereby giving a high efficiency. On the other hand, a minimal mechanical moment of inertia is realizable because the support rings which carry the friction linings have a low mass.

The support rings are preferably detachably mounted on the respective hubs so that worn friction linings can be replaced easily and at a low cost. The adjustment of the effective axial length of the clutch disc and brake disc is advantageously made by inserting shimming discs between the support rings and the hubs. If, for example, a friction lining has become worn by 0.2 mm. after some time, it is then only necessary to add a shimming disc of 0.2 mm. thickness between the respective support ring and hub, to renew operating conditions corresponding to those of a new clutch. This kind of adjustment can also be performed simply, quickly, and precisely by personnel who have received little instruction.

The dissipation of the friction heat is further improved when the flywheel, the clutch disc, the brake disc, and the brake flange are provided with communicating cooling air channels through which a stream of cooling air can pass, which is drawn in by ventilator blades on the flywheel.

The flywheel preferably includes a flywheel body and a flange cooperating with the clutch disc. The flange is connected to the flywheel body in such a way that a cooling airgap is formed between them. A similar cooling airgap is provided between the brake flange and the housing shield which holds the bearing for an output shaft, and to which the brake flange is connected. The cooling air enters through vent openings in the housing shield. This arrangement assures optimal cooling conditions in addition to the large friction surfaces. The cooling air circulates around the entire surfaces of the flanges on the flywheel and brake which cooperate with the friction linings.

Further characteristics, advantages, and possibilities of application of the invention can be derived from the following description of an embodiment, taken together with the attached drawing.

FIG. 1 is a diagrammatic illustration of the present clutch.

Figure 2:
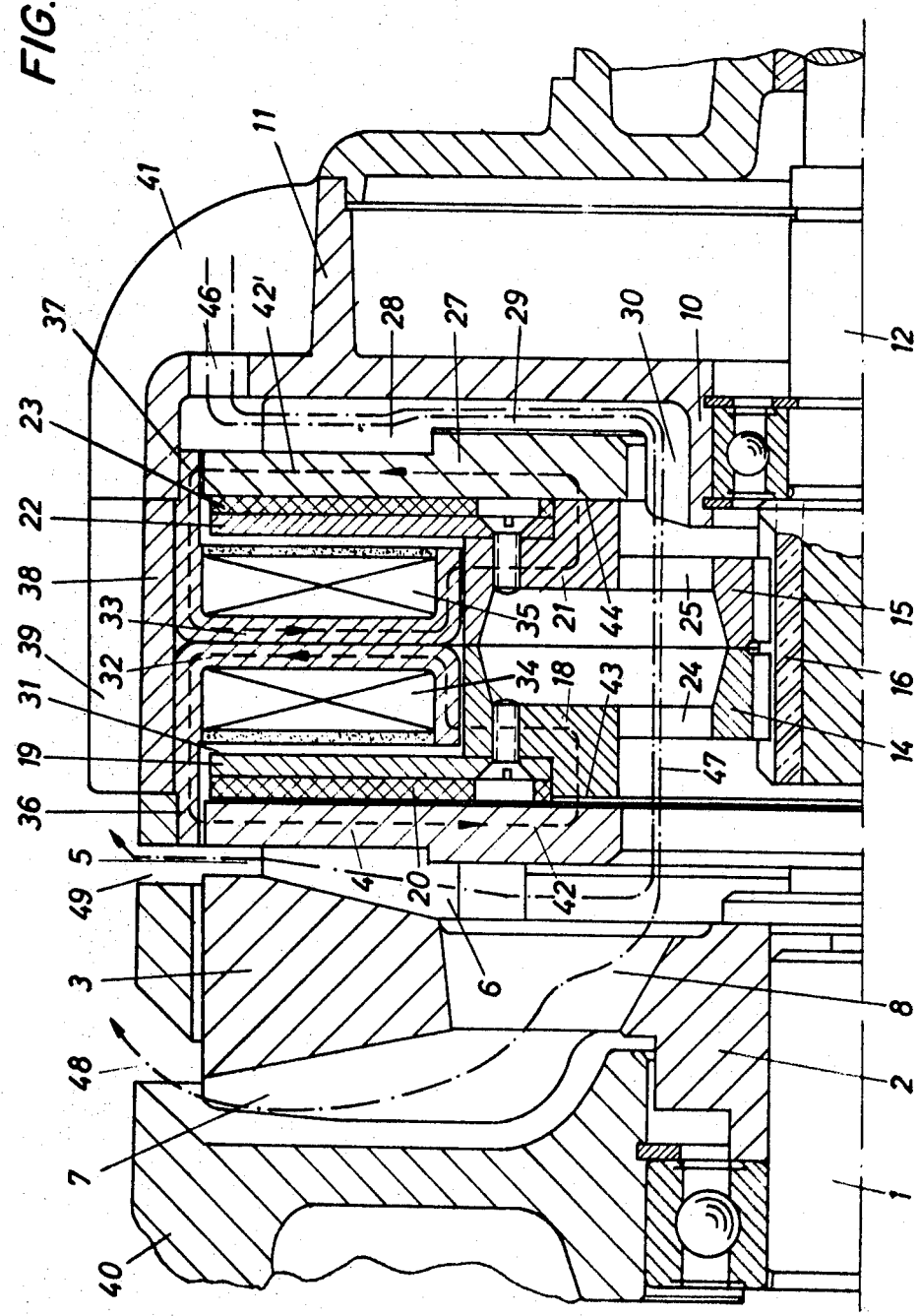

FIG. 2 of the drawing shows a partial longitudinal cross section through the clutch embodying the invention.

Referring to the drawings and more particularly to FIG. 1 thereof, the basic structure of clutch assembly 51 is illustrated in diagrammatic form and will be seen to be adapted for connection to a motor 52 having a shaft which serves as an input shaft to the assembly. The opposite side of the shaft is attached to a flywheel 54 which furnishes the clutch assembly with input power. A stationary brake flange 55 is disposed in axially spaced relation from the flywheel 54. A solenoid armature 56 is positioned between the flywheel and the brake flange and can be forced into rotational engagement with the flywheel by energizing drive control winding 59. The armature 56 is mounted to an output shaft 57 and freely passes through the brake flange 55, for connection with a utilization device 58. Thus, when winding 59 is energized, torque is transferred from the motor shaft 53 to the utilization device 58.

When braking is required, brake control winding 60 is energized to cause sliding displacement of the armature 56 from the flywheel 54 and into engagement with the stationary brake flange. Accordingly, the output shaft 57, attached to armature 56, experiences the braking action which reduces the input power to the utilization device 58.

Considering the clutch assembly in greater detail, reference is made to FIG. 2, wherein numeral 1 refers to the motor shaft denoted by 53 in FIG. 1, rotating at 3,000 r.p.m. On it is fixedly mounted a flywheel 2, denoted by 54 in FIG. 1, which includes a flywheel body 3 and a clutch flange 4 which are connected by three ribs, for example, at a radial spacing of 120°, thereby creating a cooling air passage 5. One of the three ribs is indicated at 6. On the side facing the motor the flywheel body 3 is provided with ventilator blades 7. Through the flywheel 2 reach axial cooling air channels 8.

The hub 10 of a housing shield 11 carries the bearing 11a for the output shaft 12 denoted 57 in FIG. 1. The output shaft 12 may carry, for example, a pulley (which is not shown), and the pulley may be connected over a V-belt to a utilization device, such as the main shaft of a sewing machine. The inner portion of the output shaft carries a clutch disc 14 and a brake disc 15. Both are splined to the output shaft and are axially movable thereon to a limited extent. A splined sleeve 16 has pressed onto the end portion of the output shaft 12, and this sleeve engages a corresponding groove or keyway 12a in the clutch disc 14 and in the brake disc 15. The sleeve 16 is of a nonmagnet material, preferably of plastic.

The clutch disc 14 comprises a hub 18 of a magnetically conductive material, and to it is screwed a support ring 19 facing the flywheel 2 and being preferably of aluminum. A friction lining 20 is attached to the support ring on the side facing the flywheel 2. The brake disc 15 likewise comprises a magnetically conductive hub 21 and an aluminum support ring 22 screwed to it, to which in turn is attached a friction lining 23 on the side oppositely disposed from the clutch. The clutch disc 14 and the brake disc 15 are provided with axial cooling air passages 24 and 25. Facing the brake disc 15 is a brake member or flange 27 which is connected to the housing shield 11 by ribs 28, thereby leaving between them a radial cooling air passage 29 and an axial cooling air passage 30. As can be seen from the drawing, the flywheel 2, the support rings 19 and 22, the brake disc and the brake flange all have substantially the same diameter.

Into the annular recess 31, between the support rings 19 and 22 which extend radially from the hubs 18 and 21, reaches a coil housing which, in the embodiment illustrated, consists of two oppositely disposed provide rings or cups 32 and 33, formed of sheet metal and welded together. These rings accommodate annular solenoid coils or windings 34 and 35, respectively. These windings are denoted by 59 and 60, respectively, in FIG. 1. The coil 34 surrounds hub 18 of the clutch disc 14, and the coil 35 surrounding hub 21 of the brake disc 15. The peripheral legs 36 and 37 of the profile rings reach over the clutch flange 4 of the flywheel 2 and over the brake flange 27, respectively, with a small radial clearance. On the outside of the coil housing 32, 33 is provided a cooling jacket 38 which has cooling fins 39. This jacket is firmly clamped between the motor casing 40 and the housing shield 11 which also has cooling fins 41.

When the clutch coil 34 is energized, it creates a magnetic force flow or path indicated in the drawing by the dotted line 42 which encircles the coil 34, passing through the profile ring 32, over the cylindrical gap between the profile ring 32 and the hub 18, and from there over the radial gap between the solenoid armature-forming face 43 of the hub 18 into the magnetically conductive clutch flange 4 of the flywheel 2, and returning over another cylindrical gap between the clutch flange 4 and the leg 36 of the corresponding profile ring 32. The clutch disc 14 is thereby pulled toward the flywheel 2, so that the friction lining 20 is pressed against the clutch flange 4, connecting the output shaft 12 with the motor shaft 1. Due to the adjacent proximity of the magnetically conductive mass associated with brake disc 15, it will also be pulled in the direction of flywheel 2 because the mass offers a secondary neighboring path for stray magnetic lines of force.

If instead the brake coil 35 is energized, then it creates a magnetic force flow, as indicated in the drawing by the dotted line 42', which passes through the profile ring 33 and the magnetically conductive brake flange 27, through the solenoid armature-forming face 44 of the hub 21 in the brake disc 15, and it returns over the hub 21 to the profile ring 33. This causes the brake disc 15 to shift along the sleeve 16 in the direction of the brake flange 27, thereby pressing the friction lining 23 against the brake flange 27. The clutch disc 14 will also move in this direction as just explained. As a result, the output shaft is disengaged from the motor shaft and brought to a stop.

As is evident from the drawing, the arrangement of the brake and clutch is a very compact one. In particular, it makes it possible to keep the axial distance between the flywheel 2 and the brake flange 27 of a clutch with electromagnetic control exceptionally small. This has the further advantage that the clutch may be built to the same space requirements and attachment dimensions as conventional mechanically controlled clutches, and the majority of parts of these motors can be used without modifications. The friction linings have a comparatively large diameter, being nearly of the diameter of the clutch assembly itself. This gives them an exceptionally large friction surface which, with a given magnetic force, allows the transmission of a substantially greater torque than was possible with the friction linings of smaller surfaces of the known electromagnetically operated clutches. The flywheel masses of the clutch disc 14 and the brake disc 15 are very small. It is no longer necessary to overcome the preloading forces of springs in order to operate the clutch, because the hubs 18 and 21 of the clutch disc 14 and brake disc 15 are arranged so closely together that, when winding 34 is energized for actuating the clutch disc, it automatically influences and causes the brake disc to move. Conversely, when the brake disc is actuated, the clutch disc becomes displaced from its driving position.

After removal of the housing shield 11, it is easy to replace a worn friction lining 20 or 23 by unscrewing the support rings 19 and 22 and replacing them with support rings carrying new friction linings. A particularly advantageous feature is found in the possibility of compensating for minor wear of the friction linings by inserting shimming discs (not shown) between the support rings 19 and 22 and the shoulders of the hubs 18 and 21, to which they are screwed. The thickness of these shimming discs would be equal to the wear on the friction linings.

The electrically generated heat, and the frictional heat generated in the zone of the friction linings are dissipated directly to the outside through the cooling jacket 38. The heat dissipation is further improved in an important way by the fact that the ventilator blades 7 of the continuously rotating flywheel 2 draw in air through the vent openings 46 of the housing shield 11. This cooling air flows along the dotted line 47, through the cooling airgaps 29, the passages 30, 25, and 24, and through the cooling air passage 6 and the air channels 8. It exits through the passages 48 and 49 of the motor housing 40. The cooling air thereby sweeps across practically the entire free surface of the brake flange 27 and the clutch flange 4 of the flywheel 2.

It is understood that, instead of the stationary brake flange, one may use a rotatably drivable brake flange, such as is disclosed in the German Preliminary PUblication (DAS) No. 1,159,745. Such a rotatably drivable brake flange may be rotating at a lower speed than the flywheel 2, or it may rotate at an equal speed, but in the opposite direction thereby creating a two-speed transmission, or a transmission for a reversible drive, respectively.

We claim:
1. An electromagnetic clutch assembly for selectively coupling a motor shaft to a utilization device, the assembly comprising:

a flywheel to be axially mounted to the motor shaft;

an output shaft to be mounted to the utilization device;

an annular brake member disposed in spaced coaxial relation with the flywheel and permitting passage of the output shaft therethrough, an armature having clutch disc and brake disc components slidably keyed in coaxial adjacent relation to the output shaft;

frictional linings secured to the clutch and brake discs for controlled frictional engagement with the flywheel and the brake member, respectively;

first and second coils selectively energizable and being respectively disposed in radially aligned relation with the clutch and brake discs;

and stator means coaxially mounted in intermediate relation between the discs and the coils for selectively creating a first magnetic path through the clutch disc and the flywheel for causing frictional engagement therebetween resulting in the driving of the output shaft, or a second magnetic path through the brake disc and the brake member for causing frictional engagement therebetween resulting in braking of the output shaft, wherein the stator means includes peripheral leg portions for coaxially surrounding at least part of the flywheel and the brake member with a resultant surrounding radial airgap therebetween for effecting efficient first and second magnetic paths.

2. The assembly defined in claim 1 wherein energization of a coil and generation of a resultant magnetic path causes both the clutch and brake discs to be magnetically urged in the same direction.

3. The assembly set forth in claim 2 wherein the frictional linings are located radially outwardly of their respective discs which function as magnetic armatures thereby maximizing the frictionally engaging areas.

4. The assembly set forth in claim 3 together with intermediate ring members for removably mounting the frictional linings to their respective discs.

5. The assembly of claim 4 wherein the ring members may be spaced from the discs to permit the insertion of shimming means therebetween for compensating the decreasing axial distance between the clutch and brake discs.

6. The assembly of claim 5 wherein the flywheel, the discs, and the brake member include communicating passageways therein for allowing the flow of cooling air therethrough.

7. The assembly set forth in claim 9 together with fan blades integrally attached to the flywheel for forcing cooling air through the communicating passageways.

8. The assembly set forth in claim 1, said annular brake member being stationary.

9. The assembly set forth in claim 1, wherein said fly wheel, clutch and brake discs and the frictional linings are of equal diameter to maximize frictionally engaging areas.

10. An electromagnetic clutch assembly enclosed in a housing and comprising first and second control windings located in the housing and selectively energized in response to control signals;

a solenoid armature being positioned concentric with the windings and including clutch and brake discs with oppositely disposed friction linings having first and second frictional surfaces, the armature moving in first and second directions in response to energization of the first and second windings, respectively;

an output shaft fixed to the armature and rotating therewith for causing the driving of a utilization device;

a flywheel adapted for connection to a motor shaft, the flywheel being positioned adjacent the first armature frictional surface for engagement thereby upon displacement of the armature in the first direction for causing driving operation of the output shaft;

and a brake member being positioned adjacent the second armature frictional surface for engagement thereby upon displacement of the armature in the second direction for causing braking operation of the output shaft, wherein the flywheel, clutch and brake discs, and the frictional linings are of equal diameter to maximize frictionally engaging areas;

and further wherein the stator means includes peripheral leg portions for coaxially surrounding at least part of the flywheel and the brake member with a resultant surrounding radial air gap therebetween for effecting efficient first and second magnetic paths.